(12) United States Patent
Yang et al.

(10) Patent No.: US 8,744,717 B2
(45) Date of Patent: Jun. 3, 2014

(54) SYSTEM FOR INDUCING ECONOMIC DRIVING FOR VEHICLE

(75) Inventors: Dong Ho Yang, Gyeonggi-do (KR); Sang Joon Kim, Seoul (KR); Tae Woo Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 16 days.

(21) Appl. No.: 13/540,899

(22) Filed: Jul. 3, 2012

(65) Prior Publication Data

US 2013/0144501 A1 Jun. 6, 2013

(30) Foreign Application Priority Data

Dec. 5, 2011 (KR) .......................... 10-2011-0128808

(51) Int. Cl.
*B60T 8/32* (2006.01)
*G05D 1/00* (2006.01)
*G06F 7/00* (2006.01)
*G06F 17/00* (2006.01)

(52) U.S. Cl.
USPC .......................................................... 701/93

(58) Field of Classification Search
USPC .......................................................... 701/93
See application file for complete search history.

(56) References Cited

U.S. PATENT DOCUMENTS

| | | | | |
|---|---|---|---|---|
| 5,201,889 | A * | 4/1993 | Mason | 477/43 |
| 6,092,021 | A * | 7/2000 | Ehlbeck et al. | 701/123 |
| 7,206,689 | B1 * | 4/2007 | Johnson | 701/103 |
| 8,050,856 | B2 * | 11/2011 | Duty et al. | 701/123 |
| 8,401,778 | B2 * | 3/2013 | Lee | 701/123 |
| 2007/0100512 | A1 * | 5/2007 | Funk | 701/1 |
| 2007/0129878 | A1 * | 6/2007 | Pepper | 701/123 |
| 2007/0203625 | A1 * | 8/2007 | Quigley et al. | 701/33 |
| 2007/0276582 | A1 * | 11/2007 | Coughlin | 701/123 |
| 2008/0262712 | A1 * | 10/2008 | Duty et al. | 701/123 |
| 2010/0030458 | A1 * | 2/2010 | Coughlin | 701/123 |
| 2011/0224894 | A1 * | 9/2011 | Henderson et al. | 701/123 |
| 2013/0144463 | A1 * | 6/2013 | Ricci et al. | 701/1 |

FOREIGN PATENT DOCUMENTS

| | | |
|---|---|---|
| JP | 2000-050416 A | 2/2000 |
| JP | 2009-166593 A | 7/2009 |
| KR | 10-2000-0025188 A | 5/2000 |

* cited by examiner

*Primary Examiner* — Mary Cheung
*Assistant Examiner* — Frederick Brushaber
(74) *Attorney, Agent, or Firm* — Edwards Wildman Palmer LLP; Peter F. Corless

(57) ABSTRACT

Disclosed is a technique for inducing economic driving for a vehicle. In particular, a control unit calculates a driving resistance of a vehicle based on a current rolling friction, air resistance, and a road grade of the vehicle. The an amount of air-conditioning energy consumed by the vehicle is calculated by the control unit, and in response the calculated driving resistance and air-conditioning energy are substituted into a data map to continuously calculate the optimal economic vehicle speed of the vehicle in real time. The optimal economic vehicle speed calculated by the control unit is then displayed to a driver via a display unit.

17 Claims, 3 Drawing Sheets

SYSTEM FOR INDUCING ECONOMIC DRIVING FOR VEHICLE

CROSS-REFERENCE TO RELATED APPLICATION

This application claims under 35 U.S.C. §119(a) the benefit of Korean Patent Application No. 10-2011-0128808 filed on Dec. 5, 2011, the entire contents of which are incorporated herein by reference.

BACKGROUND (a) Technical Field

The present invention relates to a system for inducing economic driving of a vehicle that provides an eco driving guide to the user in order to reduce fuel efficiency deviations within the vehicle caused due to generation of a difference in economic driving speed depending on variations of a driving load, a driving speed, and air-conditioning power to thereby induce the economic driving.

(b) Background Art

An electric vehicle (EV) uses one or more electric motors or traction motors for propulsion. There are three main types of electric vehicles exist, those that are directly powered from an external power source, those that are powered by stored electricity, and those that are powered by an on-board electrical generator, such as an internal combustion engine (a hybrid electric vehicle) or a hydrogen fuel cell. Electric vehicles include, for example, electric cars, trains, lorries, airplanes, boats, motorcycles scooters and the like.

One noted flaw with electric vehicles is that they are limited by the energy density of the battery which can severely limit the distance that the electric vehicle can travel. Thus, they are often considered inferior to the internal combustion engine since the internal combustion engine can typically travel approximately 74% further than a purely electric vehicle with no alternative source of power.

In terms of an energy consumption characteristic of the electric vehicle, however, the electric vehicle has higher energy efficiency than the internal combustion engine and thus makes the vehicle more environmentally friendly and economical. Again, however, the relative energy rate consumed while vehicle driving and supplying air-conditioning in total energy consumption is relatively larger in an electric vehicle than in the internal combustion engine.

Furthermore, the amount of energy increases as a speed increases due to certain characteristics of an electric motor. Thus total consumed energy by one driver may be different from another driver when traveling the same distance at different speeds or when one driver utilizes the air-conditioner, for example, and the other does not.

Thus, the deviation in fuel efficiency is from one driver to another is quite significant in an electric vehicle in comparison to the deviation from one driver to another in an internal combustion engine. As a result, each driver's individual economic driving speed may be different depending on variations in the driving load, driving speed, and air-conditioning power supplied.

Currently, eco-guides have begun to be applied to internal combustion engine vehicles, hybrid vehicles and the like as a method of minimizing sudden acceleration and the use of a significant air-conditioning load. As a result of utilizing these eco-guides within the vehicle, fuel efficiency can be increased.

However, the current eco-guides provided in these vehicles only provide guidance as to the acceleration and minimization of air-conditioning use. There is currently no eco-guide that accounts for an economic driving speed that dynamically adjusts according to driving load, driving speed, and variations in the air-conditioning power.

Thus, since electric vehicle fuel efficiency has an acute sensitivity when if comes to load, driving speed and variations in air conditioning power, the current eco-guide are especially unhelpful in electric vehicles.

However, this problem is not only restricted to electric vehicles, but is also applicable to hybrid vehicles and the internal combustion engine vehicles, just on a smaller scale.

Matters described as the background art are just to provide a background of the present invention, and should not be understood to correspond to the related art which has been already known to those skilled in the art.

SUMMARY OF THE DISCLOSURE

The present invention has been made in an effort to provide a system for inducing economic driving of a vehicle that provides an eco driving guide to a driver to reduce a deviation in fuel efficiency of the vehicle due to variations in driving load, driving speed, and air-conditioning power to thereby induce the economic driving.

An exemplary embodiment of the present invention provides a system for inducing economic driving for a vehicle, including: a control unit, e.g., a controller, configured to calculate a driving resistance by considering a rolling friction of the vehicle, air resistance, and a road grade, and calculate an amount of air-conditioning energy consumed by an air-conditioning device. The control unit includes a data map that is assembled to provide the driving resistance and an optimal economic vehicle speed depending on the air-conditioning energy. The control unit is configured to monitor and correspond the calculated driving resistance and air-conditioning energy with those set in the data map to continuously calculate the optimal economic vehicle speed in real time. Additionally, a display unit is configured to display the economic vehicle speed calculated by the control unit to a driver on a screen.

In some illustrative embodiments of the present invention, the driving resistance depending on the rolling friction may be calculated via a friction coefficient of a vehicle wheel and a weight value of the vehicle. Additionally or alternatively, the driving resistance depending on the air resistance may also be calculated via an air resistance coefficient, a front projection area, and a present vehicle speed of the vehicle.

In some illustrative embodiments, the driving resistance may depend on the road grade. In this embodiment, the driving resistance can be calculated through the weight value of the vehicle and a road slope.

The air-conditioning energy may vary depending on the target temperature to be targeted in the air-conditioning device. These values may be provided in the data map.

The control unit may calculate energy efficiency based on the weight of the consumption energy acquired by summing up the driving resistance and the air-conditioning energy with respect to present supplied energy of the vehicle and the display unit may display both the economic vehicle speed and the energy efficiency which are calculated by the control unit.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
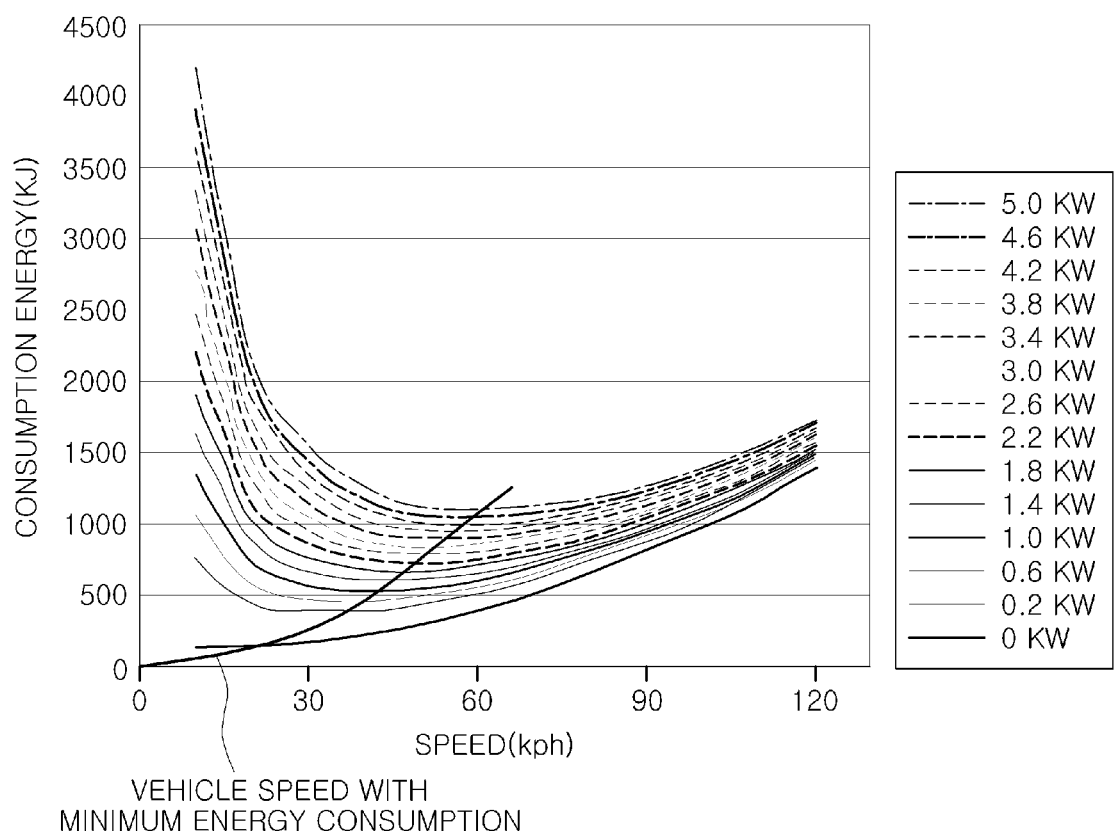
FIGS. 1 and 2 are graphs showing an example of a data map for inducing an economic vehicle speed of a vehicle according to an exemplary embodiment of the present invention.

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DETAILED DESCRIPTION

Hereinafter, a system for inducing economic driving for a vehicle according to an exemplary embodiment of the present invention will be described with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The system for inducing economic driving for a vehicle according to the exemplary embodiment of the present invention includes: a control unit, e.g., a controller, configured to calculate a driving resistance by considering a rolling friction of the vehicle, air resistance, and a road grade, and calculate an amount of air-conditioning energy consumed by an air-conditioning device. The control unit includes a data map that is assembled to provide the driving resistance and an optimal economic vehicle speed depending on the air-conditioning energy. The control unit is configured to monitor and correspond the calculated driving resistance and air-conditioning energy with those set in the data map to continuously calculate the optimal economic vehicle speed in real time. Additionally, a display unit is configured to display the economic vehicle speed calculated by the control unit to a driver on a screen.

The control unit calculates information to be displayed on the display unit and to this end, performs a calculation by importing data from various sensors of the vehicle. The control unit may use the driving resistance and the air-conditioning energy as variables in calculating that particular vehicles economic vehicle speed in real-time.

The display unit may be provided inside or outside the vehicle (e.g., as a mobile device). For example, the display unit may be embodied as a cluster or a display part of the vehicle or a mobile device.

Figure 2:
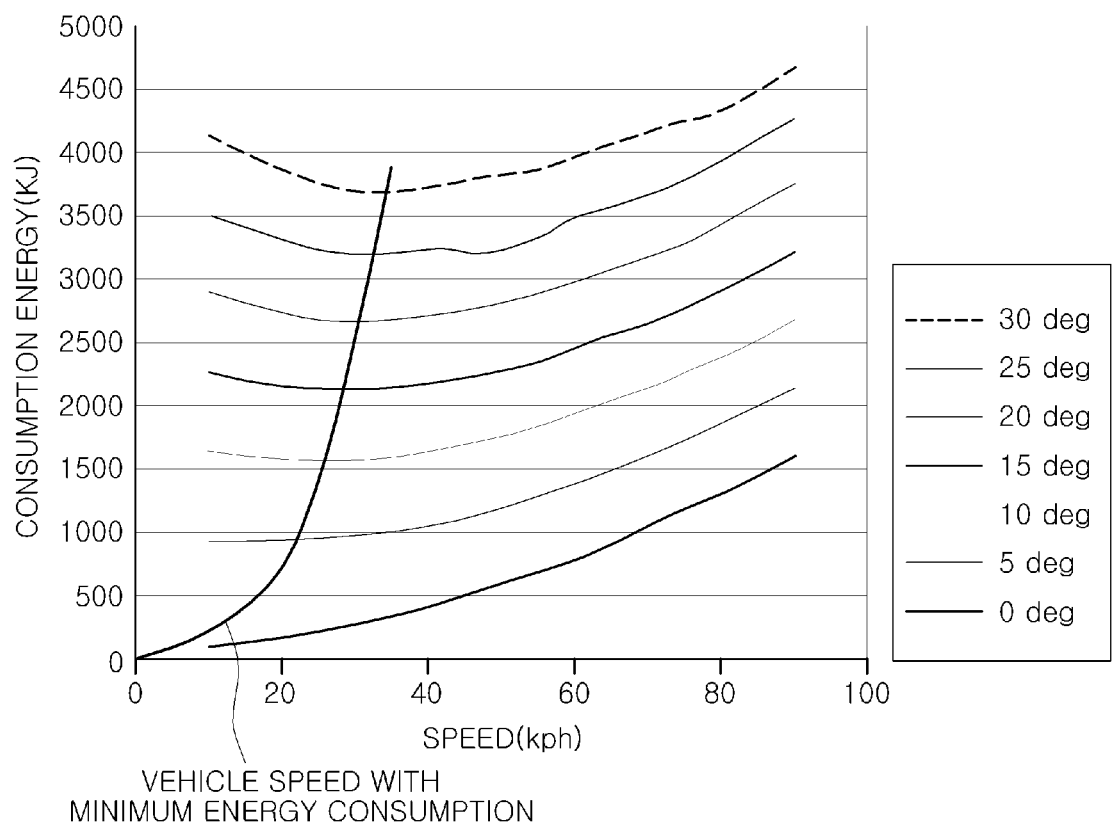

FIGS. 1 to 2 are graphs showing an example of a data map for inducing an economic vehicle speed of a system for inducing economic driving for a vehicle according to an exemplary embodiment of the present invention and FIG. 1 shows variation of the driving resistance in relation to input energy and the vehicle speed. That is, a legend on the right hand side of the data map represents input energy inputted through a motor or a driving unit and consumption energy depending upon the driving resistance for each input energy which varies depending on the vehicle speed.

In addition, FIG. 2 shows variations in the air-conditioning energy for a target temperature of the air-conditioning device and the vehicle speed. That is, the legend on the right hand side of the data map represents the target temperature of the air-conditioning device. Thus, although the target temperature is the same, the air-conditioning energy required differently depending on the vehicle speed.

Therefore, in the test examples, the optimal economic vehicle speed with minimum energy consumption is calculated, and as a result, the economic vehicle speed is set based on the economic vehicle speed with minimum energy consumption. Furthermore, the economic vehicle speed provided to the driver to induce the driver to intuitively follow the optimal calculated economic vehicle speed.

Further, through illustrative embodiment of the present invention, a driver of an eclectic vehicle that heavily utilizes, for example, the air-conditioning is provided with a more accurate optimal driving speed than would be provided by conventional eco-guides and thus would be induced to maintain a more appropriate driving speed based on that vehicle's current state.

Furthermore, the driving resistance depending on the rolling friction of the control unit can be calculated through a friction coefficient of a vehicle wheel and a mass of the vehicle. For example, the rolling friction force can be calculated as follows.

$$F_{rolling} = \mu_{tire} \cdot m_{vehicle} \cdot \text{gravity} \quad \text{[Equation 1]}$$

Wherein the $F_{rolling}$ equals the rolling friction, $\mu_{tire}$ equals the friction coefficient of the vehicle, $m_{vehicle}$ equals the mass of the vehicle and gravity equals the gravitational acceleration content (9.81 m/s).

In addition, the driving resistance depending on the air resistance of the control unit can be calculated via an air resistance coefficient, a front projection area, and a present vehicle speed of the vehicle. More specifically, the air resistance force can be calculated as follows.

$$F_{aerodynamic} = \frac{1}{2} \cdot \rho_{air} \cdot C_d \cdot A \cdot v^2 \quad \text{[Equation 2]}$$

Wherein the $F_{aerodynamic}$ equals the air resistance, $\rho_{air}$ equals the air resistance coefficient of the vehicle, $C_d$ equals the drag coefficient of the vehicle, A equals the front projection area and v equals the current velocity of the vehicle.

Further, the driving resistance depending on the road grade of the control unit can be calculated through the weight value of the vehicle and a road slope and expressed as follows.

$$F_{slope} = m_{vehicle} \cdot \text{gravity} \cdot \sin\theta \quad \text{[Equation 3]}$$

Wherein the $F_{slope}$ equals the resistance applied based on the road grade, $m_{vehicle}$ equals the mass of the vehicle, gravity equals the gravitational acceleration content (9.81 m/s), and $\theta$ equals the current slope of the road. In addition, the air-conditioning energy values vary depending on the target temperature of the interior cabin of the vehicle and may be provided in the data map of FIG. 2. Accordingly, the optimal vehicle speed depending on the driving resistance and the air-conditioning energy is expressed in the form of a 3D graphical representation through intercorrelation, and as a result, the optimal vehicle speed may be supplied based on the data map in real time.

Further, the control unit calculates energy efficiency based on a ratio of the consumption energy acquired by summing the driving resistance and the air-conditioning energy with respect to present supplied energy of the vehicle. The display unit may then display both the economic vehicle speed and the energy efficiency which are calculated by the control unit.

Figure 3:
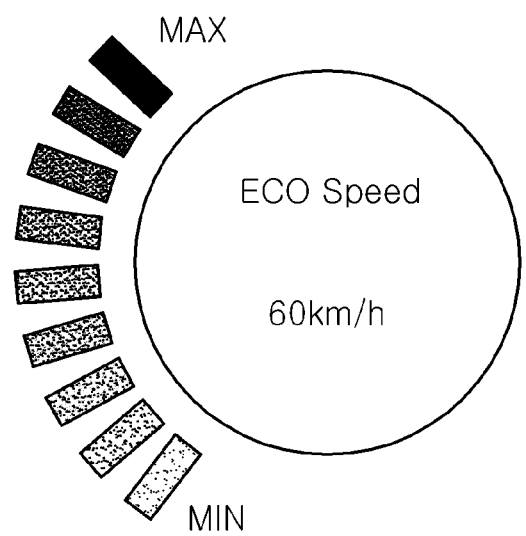
FIG. 3 is a diagram showing a graphic display on a display unit of the system for inducing economic driving of a vehicle according to the exemplary embodiment of the present invention.

FIG. 3 is a diagram showing a graphic display on a display unit of the system for inducing economic driving of a vehicle according to the exemplary embodiment of the present invention. In the illustrative embodiment of the present invention, the economic vehicle speed is calculated and displayed at the center of the cluster in real time to induce the driver to continuously utilize an optimal driving point and simultaneously. In some exemplary embodiments of the present invention, the energy efficiency is shown on the left hand side of the graphical display to visually and directly notify the driver when the energy efficiency increases when the driver follows the optimal economic vehicle speed.

Additionally, in the case of a hybrid vehicle or the electric vehicle, both regenerative braking energy and driving energy may also be displayed to provide the driver with the energy efficiency of the vehicle more stereoscopically.

Thus, the illustrative embodiment of the present invention advantageously, more accurately and effectively provides both a driver's operating state and an optimal economic driving speed compared to the existing eco guides. Further, the fuel efficiency deviation can be minimized by providing an optimal economic driving speed to the driver.

Although the above exemplary embodiment is described as using a single control unit to perform the above process, it is understood that the above processes may also be performed by a plurality of controllers or control units operated by a processor or microprocessor.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

What is claimed is:

1. A system for inducing economic driving for a vehicle, comprising:
    a controller configured to calculate a driving resistance by considering rolling friction of the vehicle, air resistance, and a road grade, calculate air-conditioning energy consumed in an air-conditioning device, and including a data map consisting of data set for the economic vehicle speed based on the driving resistance and the air-conditioning energy, and configured to correspond to the calculated driving resistance and air-conditioning energy with driving restistance and air-conditioning energy data set in the data map to continuously calculate and supply an economic vehicle speed for the vehicle in real time, to correlate the driving resistance to an amount of energy currently being consumed and the econimc vehicle speed; and
    a display configured to display the economic vehicle speed calculated by the controller to a driver,
    wherein air-conditioning energy values that vary depending on a target temperature are provided in the data map.

2. The system for inducing economic driving for a vehicle of claim 1, wherein the driving resistance depending on the rolling friction of the controller is calculated via a friction coefficient of a vehicle wheel and a weight value of the vehicle.

3. The system for inducing economic driving for a vehicle of claim 1, wherein the driving resistance depending on the air resistance of the controller is calculated via an air resistance coefficient, a front projection area, and a present vehicle speed of the vehicle.

4. The system for inducing economic driving for a vehicle of claim 1, wherein the driving resistance depending on the road grade of the controller is calculated via the weight value of the vehicle and a road slope.

5. The system for inducing economic driving for a vehicle of claim 1, wherein the controller is further configured to calculate an energy efficiency based on a ratio of the consumption energy acquired by summing the driving resistance and the air-conditioning energy with respect to a present supplied energy of the vehicle and wherein the display displays both the economic vehicle speed and the energy efficiency calculated by the controller.

6. The system for inducing economic driving for a vehicle of claim 1, wherein a force applied to the vehicle due to rolling friction is equal to a friction coefficient of a vehicle wheel times a weight value of the vehicle time gravity.

7. The system for inducing economic driving for a vehicle of claim 1, wherein a force applied to the vehicle due to air resistance is equal to ½ an air resistance coefficient times a front projection area, and a present vehicle speed of the vehicle.

8. The system for inducing economic driving for a vehicle of claim 1, wherein the force applied to a vehicle due to the road grade is equal to the mass of the vehicle times gravity times $\sin \theta$, wherein $\theta$ is equal to a current slope of a road the vehicle is currently traveling on.

9. A method for inducing economic driving for a vehicle, comprising:
    calculating, by a controller, a driving resistance based on rolling friction, air resistance, and a road grade of the vehicle,
    calculating, by the controller, an amount of air-conditioning energy consumed in an air-conditioning device;
    in response to calculating the driving resistance and the amount of air-conditioning energy consumed by the vehicle, corresponding the calculated driving resistance and air-conditioning energy with driving restistance and air-conditioning energy data set in a data map to continuously calculate and supply an economic vehicle speed for the vehicle in real time to a driver, wherein the data map correlates the driving resistance to an amount of energy currently being consumed and the econimc vehicle speed; and
    displaying, by a display, the economic vehicle speed calculated by the controller to the driver,
    wherein air-conditioning energy values that vary depending on a target temperature are provided in the data map.

10. The method of claim 9, further comprising: calculating, by the controller, an energy efficiency based on a ratio of the consumption energy acquired by summing the driving resistance and the air-conditioning energy with respect to a present supplied energy of the vehicle and wherein the display displays both the economic vehicle speed and the energy efficiency calculated by the controller.

11. The method of claim 9, wherein a force applied to the vehicle due to rolling friction is equal to a friction coefficient of a vehicle wheel times a weight value of the vehicle time gravity.

12. The method of claim 9, wherein a force applied to the vehicle due to air resistance is equal to half of an air resistance coefficient times a front projection area, and a present vehicle speed of the vehicle.

13. The method of claim 9, wherein the force applied to a vehicle due to the road grade is equal to the mass of the vehicle times gravity times sin θ, wherein θ is equal to a current slope of a road the vehicle is currently traveling on.

14. A non-transitory computer readable medium containing program instructions executed by a controller, the computer readable medium comprising:
   program instructions that calculate a driving resistance based on rolling friction, air resistance, and a road grade of the vehicle,
   program instructions that calculate an amount of air-conditioning energy consumed in an air-conditioning device;
   program instructions that, in response to calculating the driving resistance and the amount of air-conditioning energy consumed by the vehicle, correspond the calculated driving resistance and air-conditioning energy with driving restistance and air-conditioning energy data set in a data map to continuously calculate and supply an economic vehicle speed for the vehicle in real time to a driver, wherein the data map correlates the driving resistance to an amount of energy currently being consumed and the econimc vehicle speed; and
   program instructions that display the economic vehicle speed to the driver,
   wherein air-conditioning energy values that vary depending on a target temperature are provided in the data map.

15. The non-transitory computer readable medium of claim 14, further comprising: program instructions that calculate an energy efficiency based on a ratio of the consumption energy acquired by summing the driving resistance and the air-conditioning energy with respect to a present supplied energy of the vehicle and wherein the display displays both the economic vehicle speed and the energy efficiency calculated by the controller.

16. The non-transitory computer readable medium of claim 14, wherein a force applied to the vehicle due to rolling friction is equal to a friction coefficient of a vehicle wheel times a weight value of the vehicle time gravity.

17. The non-transitory computer readable medium of claim 14, wherein a force applied to the vehicle due to air resistance is equal to half of an air resistance coefficient times a front projection area, and a present vehicle speed of the vehicle.

* * * * *